J. C. YOUNGBLOOD.
FILM WINDING MECHANISM.
APPLICATION FILED JUNE 25, 1919.
1,320,818.
Patented Nov. 4, 1919.
3 SHEETS—SHEET 1.
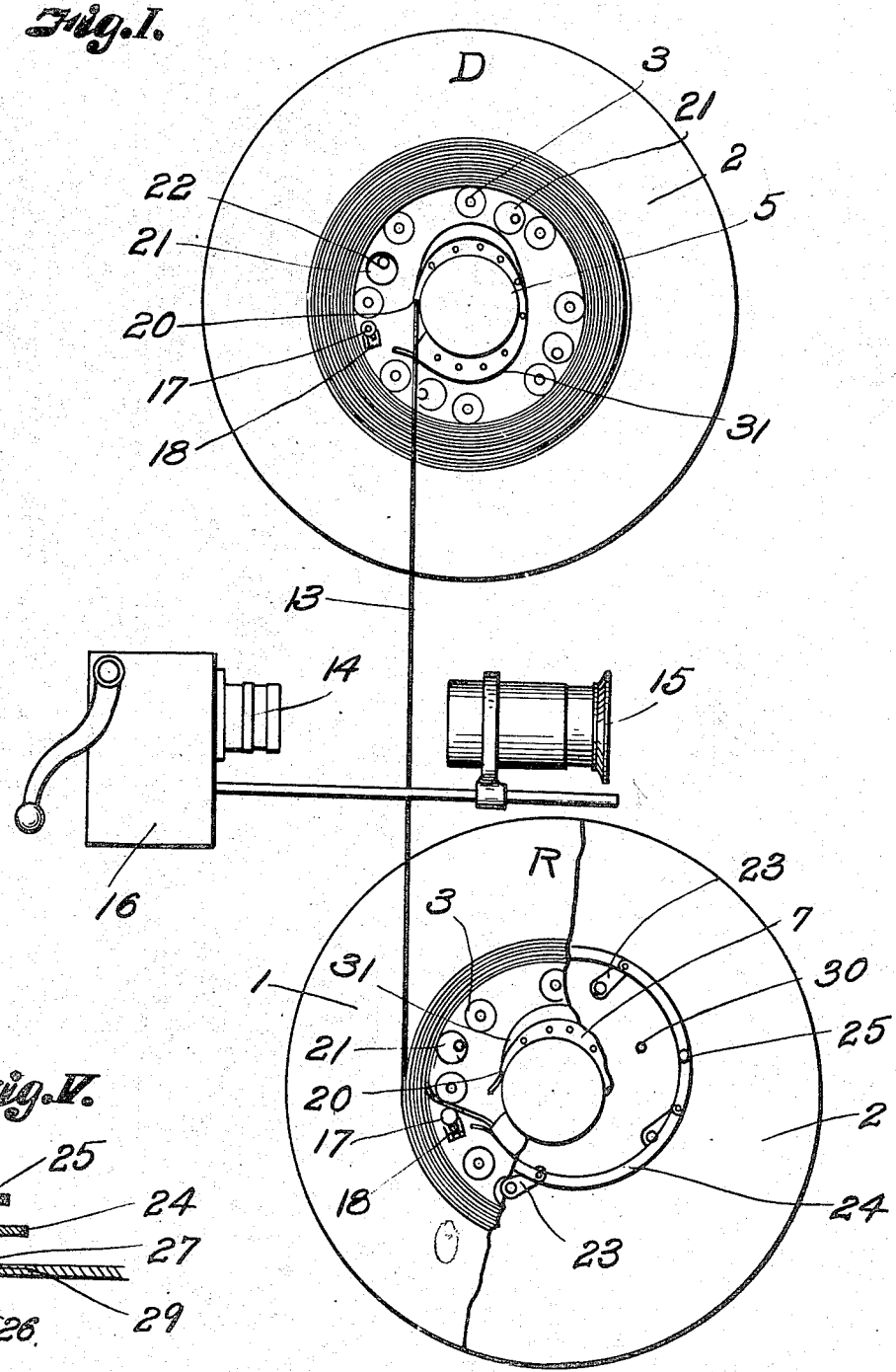
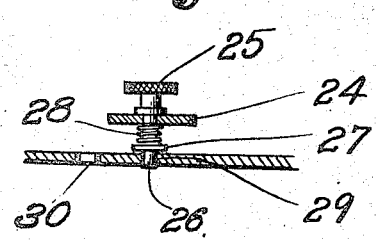
INVENTOR
Joseph C. Youngblood,
BY Arthur C. Brown
ATTORNEY

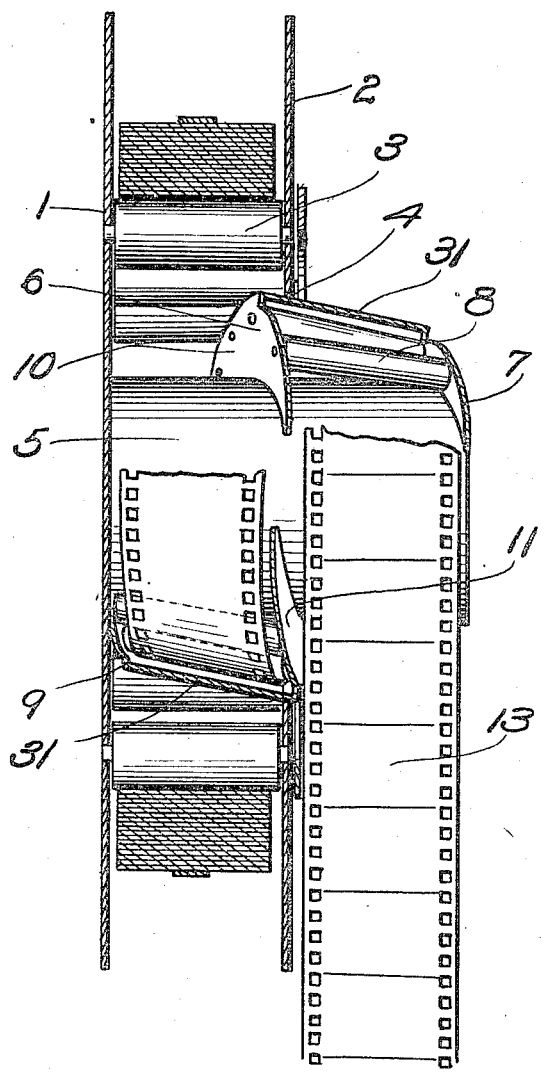
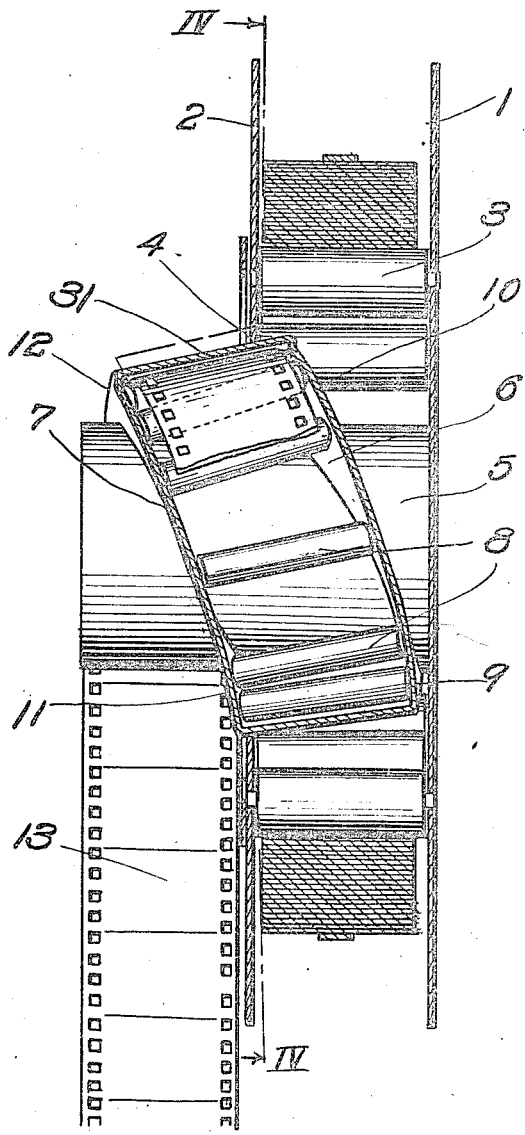

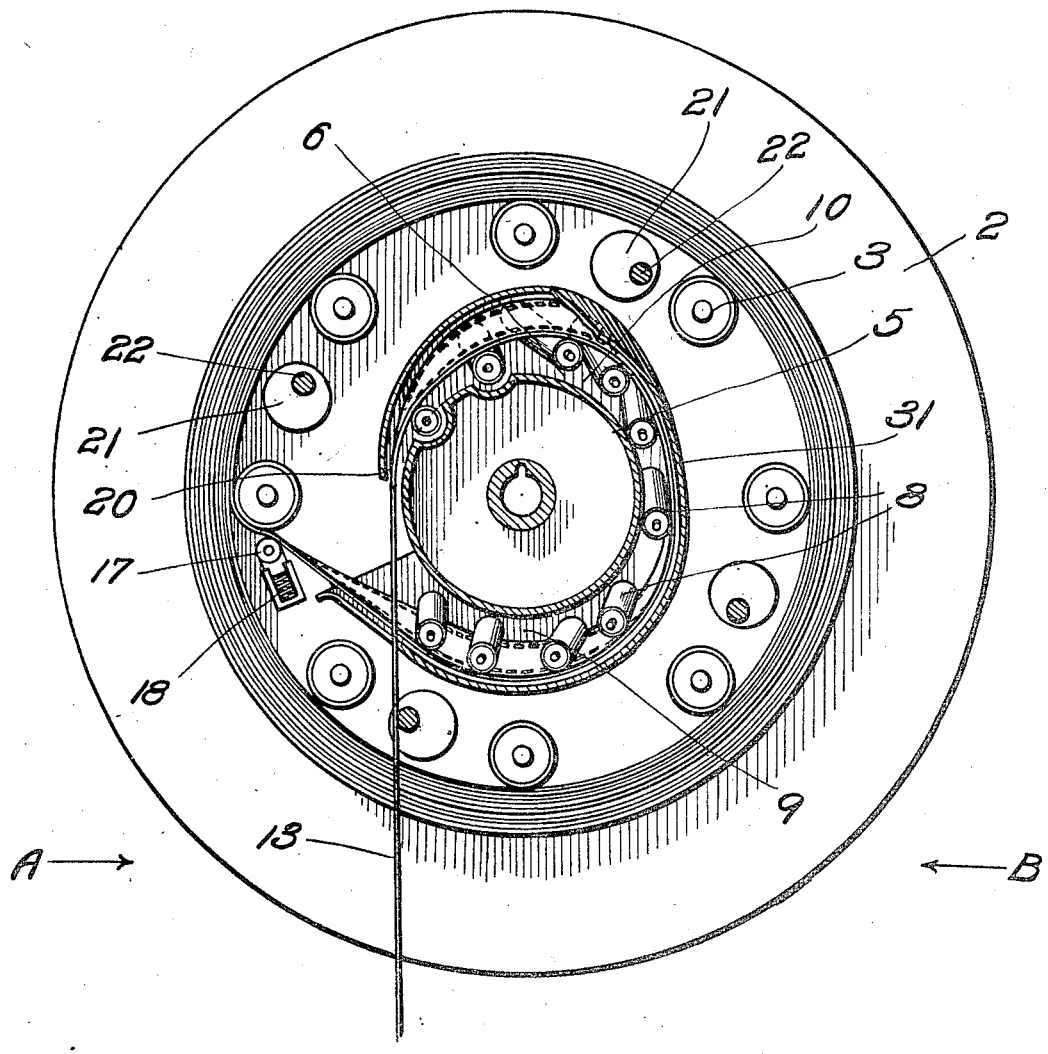
Fig. IV.
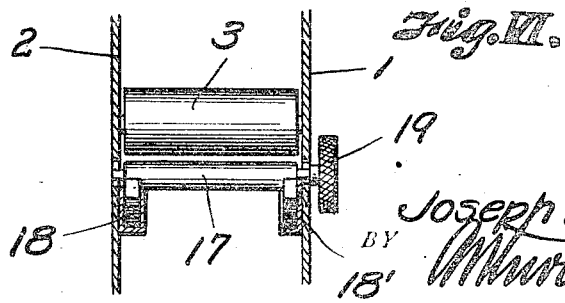
Fig. VI.

UNITED STATES PATENT OFFICE.

JOSEPH C. YOUNGBLOOD, OF ATWOOD, KANSAS.

FILM-WINDING MECHANISM.

1,320,818.  Specification of Letters Patent.  Patented Nov. 4, 1919.

Application filed June 25, 1919. Serial No. 306,680.

*To all whom it may concern:*

Be it known that I, JOSEPH C. YOUNGBLOOD, a citizen of the United States, residing at Atwood, in the county of Rawlins and State of Kansas, have invented certain new and useful Improvements in Film-Winding Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to film winding and unwinding mechanism for motion picture projecting machines, and particularly to mechanism whereby the film may be unwound from one reel onto another reel of like construction in such manner that the two reels may be interchanged so that the reel previously containing the film may become the winding reel and the reel upon which the film has just been wound may become the unwinding reel.

The primary advantage resulting from the construction embodying my invention is that the necessity for rewinding the film before the film is ready for another unwinding operation is eliminated. For example, in the earlier so-called moving picture machines, the film was intermittently fed between the condensing lens and the projecting lens of the projectoscope on to a dummy reel and after the film had been fed off the reel originally containing it, it was thought necessary to rewind the film back upon the original reel or upon a similar reel before the picture was again shown. This was considered necessary because the film was originally wound upon the reel with the last part of the picture or story on the inside of the unwound coil. Obviously as the film was unwound from the periphery of the coil upon the receiving reel in displaying the picture, the last part of the picture or story finished up on the outside of the film coil. In order to restore the film to its original arrangement, the rewinding operation was practised.

Rewinding the film not only requires considerable time but shortens the life of the film due to excessive handling, wear and tear, etc., so that it is now estimated that many thousands of dollars worth of film deteriorates each day due solely to the practice of rewinding the film after each projection of a "reel".

I have provided means whereby the film can be unwound from one reel and wound upon another reel interchangeable therewith so that when the film is completely run off from the unwinding reel, the winding reel may be changed therefor and the film will be ready to be projected without a separate rewinding operation. Thus, the wear and tear and liability of deterioration due to handling, is materially reduced.

My invention also contemplates the provision of means whereby the pull or tension exerted upon the film by the receiving reel will be evenly distributed throughout all portions of the film so as to avoid liability of uneven stretching or wear, due to binding, and according to my invention, the film is unwound from the center of the film coil on the unwinding reel and wound from the center toward the periphery on the winding reel so that the inner coils on each reel will contain the beginning of the picture.

I have also provided means whereby the film travels the shortest distance between the winding reel and unwinding reel and I am thereby enabled to mount the reel upon horizontal axes so that the film travels in a vertical plane between the condensing lens and the projecting lens of the projectoscope without the necessity of twisting or turning the unwound portion of the film during the unwinding thereof.

I am aware that it has been proposed to provide means whereby the film may be continuously wound and unwound without any intermediate steps, such as rewinding, but in all devices known to me, the film reels are mounted on vertical axes so that it becomes necessary to loop the exposed portion of the film about rollers to make it traverse a vertical path past the projectoscope lens.

In the drawings,

Figure I is a transverse sectional view through a winding reel and unwinding reel constructed in accordance with my invention, the projectoscope being shown in elevation.

Fig. II is a view partly in elevation and partly in section of a reel showing the film in its unwinding position looking in the direction of the arrow A in Fig. IV.

Fig. III is a similar view looking in the direction of the arrow B in Fig. IV.

Fig. IV is a sectional view on the line IV of Fig. III, showing the threading roll.

Fig. V is a detail view of an adjusting pin for the tension relieving device for the reel, and Fig. VI is a detail view of the threading rollers.

Referring now to the drawings by numerals of reference:

D designates the delivery or unwinding reel and R the receiving or winding reel. Each reel is a duplicate of the other so a description of one will suffice for both. The reel is shown as comprising a film-receiving portion consisting of two plates 1 and 2, connected together by a circular series of anti-friction rollers 3, upon which the film may be wound. The outer plate 2 is provided with a circular recess 4 through which projects a substantially cylindrical guide or track support 5 about which is an elliptical spiral film guide or track, the diametrically opposite portions of which are inclined in opposite directions. The spiral track is shown as constructed of two spiral flanges 6 and 7, spaced apart and secured to the support 5 by any suitable means and these flanges carry anti-friction rollers 8 over which the film may pass as it leaves the rollers 3.

By reference to Fig. II it will be observed that the spiral flanges 6 and 7 are of variable widths; for example, it will be understood that when the reel is in its unwinding position it will be held stationary by any suitable means and assuming that it is in position as shown in Fig. II, it will be observed that the bottom portion 9 of flange 6 is relatively narrower than the top portion 10, and that the bottom 11 of flange 7 is relatively wider than the top portion 12 opposite the portion 10 of flange 6, so that the bottom of the track is inclined outwardly away from the axis of the reel and that the top of the track is inclined inwardly toward the axis of the reel and that the delivery portion of the track is offset with respect to the receiving portion of the reel when the reel is unwinding; this portion, though, being the receiving portion of the reel when it is winding. Therefore, the film 13 will traverse the shortest path between the two reels in passing between the condensing lens 14 and the projecting lens 15 of the projectoscope 16.

It will also be observed that the reels are mounted upon horizontal axes so that the film traverses a vertical plane past the projectoscope to bring the picture division in proper relative position to be projected upon the screen.

The film is wound upon the rollers 3 and passes into the space encompassed by them between a feed roller 17 and one of the rollers 3, as best seen in Fig. IV. The feed roller has tension exerted against it by the springs 18 and 18′ carried by the plates 1 and 2 so as to cause it to bind the film slightly between the roller 17 and one of the rollers 3. Therefore, when the knurled nut 19 on roller 17 is rotated manually, the film from the inner coil may be fed between the rollers and over the spiral track through the opening 20 from the unwinding reel, and thence into a similar opening and through the track around the rollers 3 for the winding reel.

Since the winding of the film upon the reel R will be due to the tension exerted upon the film, there will be a tendency for the coil of film to bind against the rollers during the winding operation and under certain conditions, the film might be wound too tight upon the rollers to release when the winding reel is interchanged for the unwinding reel; but I have provided means for preventing this by applying a tension relieving mechanism which consists of appropriately located tension relieving rollers 21 which are eccentrically mounted upon shafts 22 and to each roller is connected a crank 23, the cranks being connected by links 24 so that the movement of one link will cause a corresponding movement of all of the links and consequently, rotate all of the cranks and shift the rollers 21 about their shafts 22.

On one of the links is a shifter head 25 having a depending pin 26 provided with a collar 27 between which and the link 24 is a spring 28 the pin being adapted to enter an opening 29 or 30, according to the position that the rollers are to assume. If the pin 26 is in opening 29, the cranks will be operated so as to swing the eccentric rollers 21 so that their edges will extend slightly beyond the edges of adjacent rollers 3. This will be the position that the rollers 21 will assume when the film is winding.

When it is desired to unwind the film, the pin 26 on the reel from which the film is to be unwound, will be inserted in opening 30 so that the outer edges of the rollers 21 will be inside the outer edges of the rollers 3 but the pin on the winding reel will be in opening 29 so that the edges of rollers 21 will be on the outside of the rollers 3. Therefore, the film can be caused to be wound upon the reel formed by the rollers 21 carried by the winding reel but that portion of the film carried by the unwinding reel will be permitted to rotate about the rollers 3 without friction.

It will be apparent that the film will be wound in a coil slightly in excess of the diameter of the ring formed by the rollers 3 since the rollers 21 in their film-receiving position project slightly beyond the ring formed by the rollers 3, and this will give sufficient tension upon the winding portion of the film to unwind it from the unwinding rollers D. When the film has been wound upon R, the tension-relieving rollers 21 may be retracted within the ring formed by the rollers 3 so that the tension on the film will be relieved to permit the coil to readily rotate upon the rollers 3 to assist in feeding therefrom, and since the rollers 21 are projected beyond the rollers 3 on the winding roll, the film will be held rigid with respect to the winding roll and thereby enable the film to be wound under tension, as will be obvious by reference to Fig. I. The track may be provided with a spiral cover 31 adapted to be covered by plush, felt or some other suitable fibrous material and as the film passes between the fibrous lining of the cover 31 and the rollers binding of the film due to friction will be avoided, the pressure against the film being only great enough to have a tendency to clean it. It is also apparent that the rollers 3 may be covered with suitable fibrous material if desired.

Any suitable means may be utilized for rotating the reels; for example, a crank may be fastened to the winding reel, the film being therefore unwound by rotating about its carrier.

From the foregoing it will be apparent that film may be readily unwound from one reel and wound upon another of like structure and that before the winding has begun, the knurled nut 19 may be operated to thread the film around the track so that it may be ready to deliver the film for reprojection of the picture without rewinding. Therefore, the continuous winding and unwinding of the film may continue for projecting the picture without any intermediate steps such as commonly practised.

It will also be apparent that the eccentrically mounted rollers 21 constitute a reel upon which the film may be preliminarily wound into a relatively tight coil. When the winding reel is interchanged for the unwinding reel and it becomes necessary or desirable to rotate the entire coil of film about its axis, the reel consisting of the eccentric rollers 21 will be retracted or shifted to transfer the coil onto the reel consisting of the rollers 3, and since the circumference of the reel made up of the rollers 3 will be of less diameter than that of the rollers 21 when they are in an extended position, it will be obvious that the coil of film may start to feed as soon as it is subjected to a slight pulling tension without any liability of binding.

This, I consider, an important feature as it enables the film to be removed without undue friction and wearing thereof.

What I claim and desire to secure by Letters-Patent is:

1. In film unwinding mechanism, a film storage device comprising a plurality of rollers arranged in circular series to provide a reel, and a supplementary reel projectable beyond and retractable within the periphery of the first named reel.

2. In film unwinding mechanism, a film storage device comprising a reel consisting of a plurality of rollers arranged in circular series, and film-receiving elements projectable beyond and retractable within the outer edges of certain of the rollers.

3. In film unwinding mechanism, a storage device comprising a reel upon which the film may be wound, eccentrically mounted rollers, and means for rotating the rollers so that their outer edges may be swung beyond the outer edges of the reel when the means is operated in one position and whereby the rollers will be swung within the outer edges of the reel when the means is operated in another position.

4. In film unwinding mechanism, a film storage device comprising a reel having a plurality of rollers arranged in circular series, eccentrically mounted rollers in series with said first named rollers, cranks for swinging said eccentrically mounted rollers about their eccentric bearings, and means for simultaneously actuating all of said cranks.

5. In film unwinding mechanism, a storage device comprising a reel including a plurality of rollers arranged in circular series, a spiral film-guiding track within the reel and having its discharge end offset from the reel, and a manually actuated tension roller adjacent to one of the rollers of the reel for feeding the film to the track.

6. In film unwinding mechanism, a pair of interchangeable storage devices, each of which is a duplicate of the other and each of which consists of a reel adapted to be mounted on a horizontal axis, a track leading from each reel in the form of an elliptical spiral and having a discharge end in a plane substantially parallel to the axis of the reel whereby the film will be delivered from the discharge end of one track to the receiving end of the other track in a direct vertical plane to maintain an equal tension throughout the exposed portion of the film from the unwinding reel to the winding reel.

7. In film unwinding mechanism, a storage device upon which the film may be wound in a continuous coil, and means for relieving the tension on the inner circumference of the coil, said means comprising eccentrically mounted rollers.

In testimony whereof I affix my signature.

JOSEPH C. YOUNGBLOOD.